Jan. 12, 1960
E. O. SOWERWINE, JR
2,921,022
THREE STAGE HYDRODESULFURIZATION PROCESS
EMPLOYING NICKEL CATALYST
Filed May 18, 1956
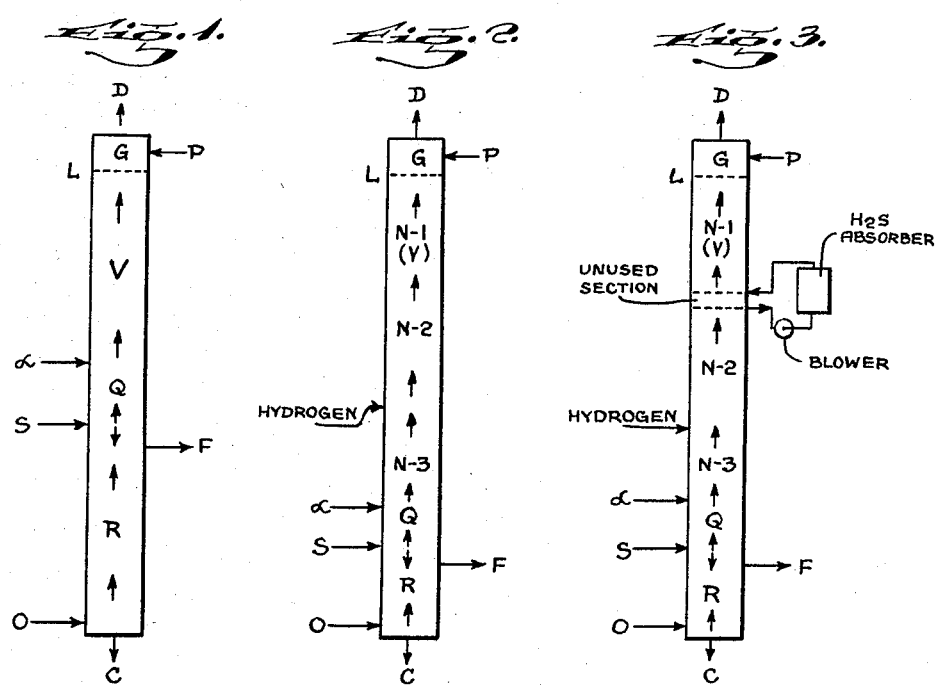
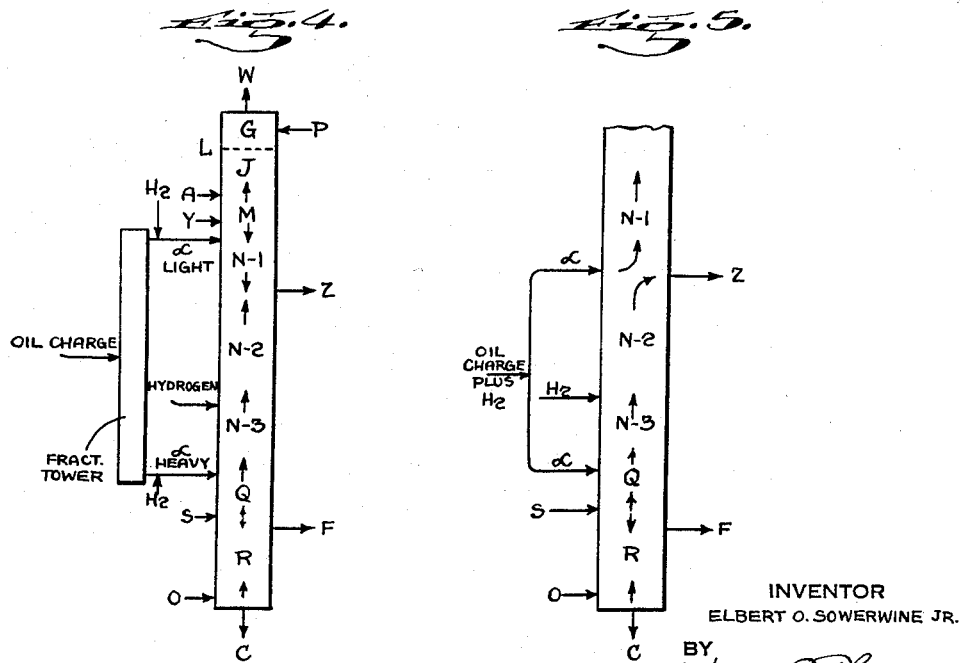
INVENTOR
ELBERT O. SOWERWINE JR.
BY
Howard Thompson
ATTORNEY

United States Patent Office 2,921,022
Patented Jan. 12, 1960

2,921,022

THREE STAGE HYDRODESULFURIZATION PROCESS EMPLOYING NICKEL CATALYST

Elbert O. Sowerwine, Jr., Wapiti, Wyo., assignor to Marion H. Gwynn, Morris Plains, N.J.

Application May 18, 1956, Serial No. 585,677

20 Claims. (Cl. 208—210)

This invention relates to the hydrofining or catalytic desulfurization of sulfur bearing organic fluids such as sulfur-bearing petroleum fractions. More particularly the invention relates to improved hydrofining procedures employing nickel catalysts wherein hydrofining is conducted in a plurality of stages of variable duration or extent, providing selective control of the manner in which sulfur is predominantly recovered in by-products. This application is a continuation-in-part of my co-pending application Serial No. 392,934, filed November 18, 1953, now abandoned.

There have in recent years been many developments in the hydrofining or desulfurization of sulfur-bearing organic fluids by the use of catalytic materials, including nickel and nickel compounds such as nickel oxide and nickel sulfide as catalysts. These processes for hydrofining of organic fluids such as hydrocarbon distillates derived predominantly from various petroleum crudes effect desulfurization, hydrogenation and dehydrogenation to varying degrees. The processes heretofore proposed can be divided into two distinct groups:

(a) Those which ultimately use the nickel in the form of a nickel sulfide and which material catalyzes the general reaction

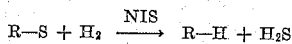

in which nickel sulfide is a true catalyst. These processes sometimes start with metallic nickel or nickel oxide in which case an inconsequential amount of desulfurization may occur during the process of sulfiding the nickel to obtain the nickel sulfide catalyst, but in general the nickel sulfide is prepared in advance of its actual useful desulfurization use. An example is the process of R. M. Cole, U.S. Patent No. 2,392,579. Such processes use sulfur-immune catalysts which are not poisoned by sulfur and commercially preferably employ catalysts other than nickel.

(b) Those which use the nickel compound both as a catalytic reagent and as a true catalyst. Here the predominating desulfurization reaction is of the type

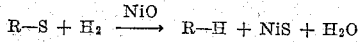

An example of these is the process of Gwynn, U.S. Patent No. 2,587,149. Such processes use sulfur-sensitive catalysts. The very "poisoning" of the catalyst is utilized.

Processes of type (a) above in which sulfur is removed predominantly as $H_2S$ have the following economic drawbacks:

(1) Catalyst although not subject to sulfur poisoning is quite rapidly inactivated by the deposit of resins, tars and the like from hydrocarbon charge stocks, and procedures for regenerating the catalyst by removing such deposits have been either costly or have resulted in lowered catalytic activity.

(2) Dissolved hydrogen sulfide sours the hydrocarbon product.

(3) The hydrogen sulfide which is produced can be salvaged by a by-product, elemental sulfur or sulfuric acid, only from a large unit installment, and in most instances the amounts of hydrogen sulfide produced would merely constitute an objectionable waste material.

(4) The conditions which favor catalytic production of hydrogen sulfide also tend to partially desulfurize the nickel sulfide. This increases the cost of chemical regeneration via $NiSO_4$, somewhat more sulfuric acid consumption being required for such regeneration.

And under the process conditions that have been disclosed:

(5) Hydrogen sulfide tends to be a very corrosive gas, thus requiring expensive alloy construction materials, which coupled with the requirements for high pressure and temperature operation add materially to the construction cost.

(6) The process tends to be a net consumer of hydrogen, a fact which in most instances would add substantially to the operating costs.

(7) The high temperatures and pressures employed can impair the quality of the hydrocarbon product producing material of relatively poor odor, color, and stability, due to objectionable compounds formed by thermal decomposition.

(8) The high temperature and pressure cause a high product loss, also due to thermal decomposition mentioned above.

(9) Fuel and/or power requirements are high due to the high temperatures and high pressures used.

The other type of process in which the sulfur is removed predominantly as nickel sulfide has the following economic drawbacks:

(1) Since sulfur is removed by chemically combining with nickel, the desulfurization effected by a given quantity of catalyst is small compared with desulfurization effected by a truly catalytic method. Thus the catalyst life is short and the importance of an inexpensive regeneration procedure is magnified. While chemical regeneration is satisfactory for maintaining catalyst activity, it is costly unless the value of the by-product compares with the cost of materials used for regeneration.

(2) The most likely regenerating materials are alkalis of sodium, the costs of which vary in different places and from time to time. They lead to recovery of sodium sulfate as a by-product, and while this product is always salable its relative value fluctuates sharply from place to place and from time to time, whereby the net regeneration cost fluctuates in a commercial process.

The new hydrofining process in accordance with the present invention combines the best features of the two general procedures above described. Regarded in certain of its broader aspects, the new process in accordance with my invention comprises multiple stage hydrofining by initially contacting fresh nickel catalyst with sulfur-containing hydrocarbons under conditions which will favor the removal of sulfur by the catalyst as nickel sulfide, then contacting the catalytic nickel sulfide wtih sulfur-containing hydrocarbon under conditions which favor removal of sulfur by catalytic formation of hydrogen sulfide, and then contacting the partially desulfided catalyst with sulfur-containing hydrocarbons under conditions which favor the resulfiding of the catalyst to a maximum, and repeating the second and third hydrofining stages above described while the catalytic activity is maintained to yield a spent catalyst which is predominantly nickel sulfide, and then regenerating the spent catalyst by controlled oxidation to nickel sulfate and reacting with alkali according to known procedures.

The improved process can be used in a batch manner wherein the different hydrofining stages are conducted in separate reactor chambers, but it is particularly suited to continuous operation and more particularly to a continuous operation in a unitary reaction chamber wherein the catalytic material is moved through a plurality of zones, and wherein fluid barriers are included to separate the reactions in the various zones. Apparatus of this general type have been more fully disclosed and claimed in my prior application, Serial No. 355,138, filed May 14, 1953 (since abandoned).

In carrying out my hydrofining process wherein fresh catalyst is utilized in three or more distinct hydrofining stages or zones and is ultimately discharged as spent catalyst predominantly in the form of nickel sulfide, the initial or fresh catalyst can be nickel oxide or other catalyst of the nickel oxide type such as nickel peroxide, nickel dioxide, basic nickel carbonate, and the like. With each of these catalysts the desulfurization is effected primarily by a conversion of the nickel compound to nickel sulfide, but for simplicity the fresh catalysts will be referred to collectively as nickel oxide type catalyst.

In the first hydrofining stage, the nickel oxide type catalyst is contacted with sulfur-containing hydrocarbon vapors and hydrogen under conditions favoring the general reaction (1) $2R-S + 2NiO + 3H_2 \rightarrow 2R-H + 2NiS + 2N_2O$ As taught in Gwynn Patent No. 2,587,149 above mentioned, the extent of desulfurization by this reaction depends on proper selection of tempertaure and/or hydrogen concentration for the particular hydrocarbon stock being treated. In general the temperatures may vary from the temperature at which the hydocarbon is vaporized up to about 725° F. with the optimum temperature being a function of the hydrocarbon stock, of the hydrogen concentration, and of the pressure employed, and for each particular hydrocarbon stock an optimum temperature exists above or below which the sulfur removal efficiency is reduced. By way of illustration, with a commercial No. 3 oil from predominantly Oregon Basin, Wyoming, crude, and utilizing about 1 cubic foot of hydrogen per pound of oil, and an absolute pressure of approximately 640 mm. of Hg, the optimum temperature for desulfurizing is about 630° F. in the first state of hydrofining. If any $H_2S$ is present in the hydrocarbon vapors in the first hydrofining stage, it will tend to react according to the reaction (2) $NiO + H_2S \rightarrow NiS + H_2O$. Thus in the first hydrofining stage, sulfur is removed from the vapor stream as nickel sulfide. The temperature is maintained low enough or the temperature, hydrogen concentration, and pressure are severally maintained low enough so that reactions which produce hydrogen sulfide (reactions 3, 4, 5 and 6 hereinafter mentioned) cannot occur to any appreciable extent.

In the second hydrofining stage, the sulfided catalyst formed in the first stage is contacted with sulfur-containing hydrocarbon vapors and hydrogen under conditions favoring the formation of $H_2S$. These reactions are of three general types:

(a) Reactions resulting in production of $H_2S$ with no production or consumption of NiS. An example of this strictly catalytic type reaction is (3) 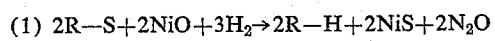
$3H_2 + 2R-S \xrightarrow{NiS} 2R-H + 2H_2S$ (b) Reactions resulting in production of $H_2S$ by at least partially desulfiding the catalyst. Reactions of this type are (4) $NiS + H_2 \rightarrow Ni + H_2S$ and (5) $2NiS + H_2 \rightarrow Ni_2S + H_2S$ (c) Reactions resulting in the production of $H_2S$ concurrently with the production of NiS. Reactions of this type include (6) $Ni + 2H_2 + 2R-S \rightarrow NiS + H_2S + 2R-H$ and (7) $Ni_2S + 2H_2 + 2R-S \rightarrow 2NiS + H_2S + 2RH$.

The type (a) reactions are aided by increased pressure, hydrogen concentration, and temperature, as well as by increased catalytic activity and surface availability of the nickel sulfide. The type (b) reactions are aided primarily by increased hydrogen concentration, while type (c) reactions are aided primarily by increased hydrogen concentration and increased pressure.

The optimum desulfurizing conditions in the second hydrofining stage will of course vary to some extent with different charge stocks. With the first and second hydrofining stages operating at substantially the same pressure, it will be apparent that the reaction conditions in the second stage differ primarily in providing a substantially higher temperature and preferably higher hydrogen concentration than in the first stage. Thus it is preferably in the first stage to maintain a temperature below about 650° F. and in the second stage to maintain a temperature above about 650° F.

The average NiS concentration of the catalyst in the second hydrofining stage is of course dependent on the relative reaction rates of the type (b) and type (c) reactions. Since the hydrogen concentration must be high for both type reactions, the simpler nature of the type (b) reactions tends to favor the latter, and particularly so if the second hydrofining stage is being operated at a relatively low pressure. Thus in the second hydrofining stage there is generally a gradual reduction in the concentration of NiS as it is converted toward $Ni_2S$ and Ni, and the catalyst as it leaves the second hydrofining stage has become substantially less sulfided.

In the third hydrofining stage, the partially desulfided catalyst is resulfided to NiS, the reactions in this stage being of the type (8) 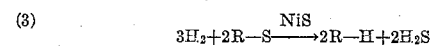 $2Ni + H_2 + 2R-S \rightarrow 2NiS + 2R-H$ and (9) $2Ni_2S + H_2 + 2R-S \rightarrow 4NiS + 2R-H$. High pressure and low hydrogen concentration are the main direct factors which favor these reactions. This third hydrofining stage is generally of relatively short duration and serves the purpose of converting the catalyst to a form in which it can be readily subjected to chemical regeneration via nickel sulfate. On the other hand, the resulfiding of the catalyst may also make it usable in further hydrofining, and, if at this point the catalyst is sufficiently free of carbonaceous deposits, a fourth and fifth hydrofining stage can be included repeating the type reactions which characterize the second and third stages. In adding additional hydrofining stages, however, it is important that the final stage be similar to stage 3 wherein the catalyst is resulfided to thus prepare it for chemical regeneration. 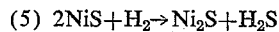

The ability to repeat the second and third hydrofining stages as above described is of particular advantage when conditions make it economically desirable to remove sulfur primarily as $H_2S$ as for example when facilities are available for converting $H_2S$ to elemental sulfur or sulfuric acid. It will further be noted in this connection that when sulfur removal as $H_2S$ is desired, the conditions in the second hydrofining stage or in later stages similar thereto can be suitably varied to extend or prolong the hydrofining which is carried out in this stage. On the other hand, if there is a change in the by-product market making it economically advantageous to produce increased amounts of sodium sulfate, the hydrofining in the second stage leading to production of hydrogen sulfide can be kept at a minimum, and the catalyst can be converted more quickly to the fully sulfided form, and then subjected to chemical regeneration via nickel sulfate to recover sodium sulfate as the desired by-product.

In the three hydrofining stages above mentioned, there are competing reactions including in particular dehydrogenation reactions wherein petroleum hydrocarbons can be partially dehydrogenated to yield products of an olefinic or aromatic type. These dehydrogenation reactions are aided primarily by catalyst activity and increased temperature. With nickel catalyst for example appreciable dehydrogenation can occur at as low as 600° F. with the reaction becoming much more pronounced at temperatures over 700° F. Furthermore, the nascent hydrogen as it is thus produced by dehydrogenation is more active than molecular hydrogen and it will therefore be apparent that regulation of the rate of dehydrogenation in the several stages has a major influence on the desulfurization effected in such stages.

In stage 3 for example, where a limited amount of hydrogen is desired for most efficient sulfiding of the catalyst, the temperature should be appreciably lower than in stage 2 where increased hydrogen concentration favors desulfurization. Similarly in the first hydrofining stage, the maintaining of a low temperature to retard dehydrogenation acts to favor desulfurization as it is effected in that stage.

The efficiency of desulfurization in my second hydrofining stage is surprisingly greater than is the efficiency of previously known methods for desulfurizing to remove sulfur as hydrogen sulfide. The apparent reason for this is that the nickel sulfide formed in my hydrofining stage 1 has an unusually high catalytic activity for the reactions taking place in stage 2, with the result that these reactions can take place under relatively low temperature and pressure conditions, thus avoiding the rapid inactivation of catalyst normally experienced with higher temperatures and pressures as previously employed. In thus avoiding rapid catalyst inactivation in stage 2 and being able to operate at relatively low temperatures and pressures, there is little if any thermal decomposition of the hydrocarbon oil being treated.

A particular advantage in my new combined process is its extreme flexibility in operation. The temperature and hydrogen concentration can be varied independently in each hydrofining stage, and to a lesser extent the pressure can also be varied. These variables coupled with selectivity in the catalyst employed and the relative size of the zones in which the several hydrofining stages are conducted cooperate to obtain optimum desulfurization and product quality, to balance hydrogen production and consumption to the desulfurization requirements and, as above mentioned, to permit selective removal of sulfur predominantly as hydrogen sulfide, or predominantly as nickel sulfide, depending upon the type by-product desired.

In carrying out my process in the preferred manner by utilizing a unitary reaction chamber having a plurality of reaction zones separated by fluid barriers, as disclosed in said prior application, Serial No. 355,138, the three hydrofining stages can be carried out either completely countercurrently with respect to the flow of catalyst, or, if desired, can be carried out partly countercurrently and partly concurrently with respect to the catalyst flow. With a completely countercurrent flow of material being hydrofined, there is one reaction, i.e., reaction 2 above, in the first hydrofining stage which can be troublesome unless free hydrogen sulfide is prevented from reaching this stage. In this reaction fresh catalyst meeting vapors which may contain about 1% of hydrogen sulfide would be partially spent in removing sulfur from the hydrogen sulfide rather than from the hydrocarbon vapors themselves. This can be avoided in a completely countercurrent operation by withdrawing vapors between the first and second hydrofining stages and chemically removing hydrogen sulfide from the vapors, as for example by treating with lime to absorb hydrogen sulfide. Alternatively, the first hydrofining stage can be conducted in either a countercurrent or a concurrent manner with a separate feed of hydrocarbon vapors, thus preventing hydrogen sulfide from reaching the first hydrofining stage. It should be noted, however, that these variations although making for greater efficiency in the utilization of catalyst are not essential to a successful use of my process, since removal of sulfur from hydrogen sulfide in the first hydrofining stage does not in any way impair the activity of the catalyst in this stage or the succeeding hydrofining stages.

The catalyst originally entering the unitary column or reactor is first dried or dried and calcined, then utilized to hydrofine hydrocarbon vapors and the spent catalyst primarily as nickel sulfide is oxidized to nickel sulfate before being discharged from the column.

The practical applications of my process will be more readily apparent from consideration of the accompanying drawings which diagrammatically show suitable columns for carrying otu my process according to a fully countercurrent and partially concurrent procedure. In the drawing:

Fig. 1 diagrammatically shows a typical column adapted for desulfurization of hydrocarbon vapors in accordance with the process disclosed claimed in my prior application, Serial No. 355,138, and is included for purposes of comparison.

Fig. 2 diagrammatically shows a column similar to that shown in Fig. 1 but indicating three hydrofining zones in accordance with the present invention, and wherein drying of catalyst is effected in the first hydrofining zone.

Fig. 3 diagrammatically shows a column similar to that shown in Fig. 2 wherein hydrocarbon vapors are withdrawn between the first and second zones for removal of hydrogen sulfide.

Fig. 4 diagrammatically shows a modification of the column shown in Fig. 3 but arranged to operate concurrently in the first hydrofining zone and countercurrently in the second and third zones, with drying of catalyst separate from the hydrofining, and with product and hydrogen sulfide discharged between the first and second hydrofining zones.

Fig. 5 diagrammatically illustrates a further modification of the columns shown in Fig. 3 or 4 showing only the hydrofining and regenerating portions thereof and indicating a countercurrent feed of hydrocarbon vapors through zone N–1, separate from the feed through zones N–3 and N–2.

In the drawing the various zones within the columns and materials added to and withdrawn from the columns have been designated by symbols which have the same meaning wherever used in this application and said prior application, Serial No. 355,138.

A. Air for drying catalyst at a temperature of about 60° F. to 400° F.

B. Waste gas from drying and calcining catalyst, including air, moisture, $CO_2$ (if the catalyst is a carbonate) and part of I.

C. Oxidized spent catalyst discharged from unit as hot granules and power predominantly nickel sulfate.

D. Product vapors contaminated with moisture, $CO_2$ (if the catalyst is a carbonate), most of the item S, and hydrogen recycle.

F. Waste gas from oxidation step, including $CO_2$, some $SO_2$, $N_2$, trace to no $C_2$, and $H_2O$, and having a temperature of about 600 to 1000° F.

G. Disengaging zone, space between the top of the catalyst bed to the top of the chamber into which fresh catalyst in introduced.

J. Drying zone, extending from the top of the catalyst bed to the drying air inlet (A) when drying is countercurrent.

L. Catalyst level.

M. Separating zone between catalyst preparation (drying and/or calcining) and the hydrofining operation.

N–1. First hydrofining zone.

N–2. Second hydrofining zone.

N–3. Third hydrofining zone.

O. Oxygen containing oxidizing gas at a temperature of 100 to 1000° F. and containing a trace to about 10% of $O_2$ and inert gases such as $CO_2$, $N_2$, and $H_2O$ or possibly predominantly $SO_2$.

P. Catalyst paste comprising nickel hydroxide or a nickel carbonate containing about 1 to 20% water and at a temperature of about 60 to 300° F. (preferably about 200° F.).

Q. Purging zone; heavy organics are stripped from catalyst with inert gas, also serves as separating zone between hydrofining and oxidation zones.

R. Oxidation zone; nickel sulfide, residual heavy organics, and coke are oxidized.

S. Stripping inert gas which will not interfere elsewhere, such as $H_2O$, $CO_2$, and the like, which may be hot or relatively cool.

V. Drying and hydrofining zone; when both operations are done with same gases.

Y. Inert separating gas, i.e. carbon dioxide or dry steam.

α. Inlet gas (untreated vapors and recycled hydrogen).

The structural arrangement and basic functioning of columns are diagrammatically shown in the drawing. In brief summary the various zones within a column or reaction chamber wherein incompatible reactions are taking place are separated by fluid barriers comprising inert fluid which is introduced between adjacent incompatible zones at a controlled pressure greater than the pressure in either of said zones. The inert fluid thus introduced can also act as a heating or cooling medium.

In Figs. 1, 2, and 3 a single vapor barrier of this type is shown at S for separating the hydrofining zones from the oxidizing zone. If desired, however, an inert fluid can be introduced at the "unused section" of the column as shown in Fig. 3 (where vapors have been withdrawn for hydrogen sulfide removal) in order to provide a sharper separation between the first and second hydrofining zones. In Fig. 4, on the other hand, it will be noted that two such vapor barriers are employed, i.e. at (M), between drying zone (J) and the hydrofining zone (N-1), and at (S), between hydrofining zone (N-3) and the oxidizing zone (R).

In the overall process as shown in the various columns diagrammatically illustrated in the drawing three basically different steps or operations are performed, i.e. preparation of the catalyst by drying and/or calcining, utilization of the catalyst for the hydrofining or desulfurizing of hydrocarbon vapors, and partially regenerating the spent catalyst essentially to nickel sulfate. The improvement of the present invention, however, pertains to the three stage hydrofining operation whether conducted with or apart from the preparation and regeneration steps and whether in a single chamber or separate hydrofining chambers.

With the new three-stage hydrofining, as indicated in Figs. 2 to 5, the amount of hydrocarbon vapors that can be desulfurized with a given weight of catalyst is increased many-fold; or conversely, with a given rate of feed of hydrocarbon vapors the rate of feed of catalyst can be reduced many-fold, as compared with operation of a single hydrofining stage as shown in Fig. 1. The examples hereinafter presented give a typical comparison wherein the amount of catalyst employed in the new process is only about one-tenth the amount required in the old process, using the same size equipment and same feed of hydrocarbon vapors.

The three stages of hydrofining are conducted at an essentially uniform pressure of about 100 p.s.i.g. with variations, depending upon the particular vapors being treated from about 25 to 250 p.s.i.g. The temperatures in the first and third hydrofining zones are of the same order and below about 650° F., whereas the temperature in the second hydrofining zone is substantially higher and preferably within the range of about 650–750° F. Hydrogen concentration in the first and third hydrofining zones is preferably low. A high hydrogen concentration is needed in the second zone, and may be obtained by introducing hydrogen or hydrogen containing gas between zones 2 and 3. This permits desired control of hydrogen concentration in zones 2 and 3. In zone 1 where more than the desired amount of hydrogen may be present (in completely countercurrent operation) this can be compensated for in part by using a suitably low temperature.

The following examples show comparative operating conditions for treating a particular sulfur bearing oil at the same rate in the same size equipment, Example I employing a single hydrofining stage; and Example II employing three hydrofining stages in accordance with my new process. It is to be understood, however, that these examples are given by way of illustration and not of limitation.

EXAMPLE I

In a column 40 ft. high and 2 ft. in diameter operating in the manner shown in Fig. 1, treating at the rate of about 100 barrels per day No. 3 oil (Oregon basin Wyoming crude) containing 2.13% sulfur and recovering No. 3 oil containing 0.5% sulfur, and operating at approximately atmospheric pressure, the various zones have the approximate heights: G=3 ft., V=16 ft., Q=4 ft. and R=17 ft.

The material flow and temperature conditions are tabulated below:

| Component | Temp., °F. | Composition | Rate in lb./min. |
|---|---|---|---|
| P | 200 | Basic nickel carbonate | 1.27 |
| | | Water | .31 |
| D | 565 | Treated heavy oil vapor | 19.85 |
| | | Treated light oil vapor | .88 |
| | | Carbon dioxide | .19 |
| | | Steam | 1.44 |
| | | Hydrogen (to recycle) | .17 |
| α | 600 | Untreated oil vapors | 21.29 |
| | | Hydrogen | .18 |
| S | 350 | Steam | .99 |
| | | (Flowing upward) | .66 |
| | | (Flowing downward) | .33 |
| F | 800 | Carbon dioxide | 3.56 |
| | | Nitrogen | 18.92 |
| | | Water | 13.34 |
| O | 500 | Air | 5.35 |
| | | Recycle gas | 19.92 |
| C | 600 | Nickel sulfate | 1.67 |

In addition, steam at about 350° F. is introduced into the oxidizing zone R at the rate of about 10.47 lb./min. to maintain a maximum temperature in said zone of about 900° F.

EXAMPLE II

In a column 40 ft. high and 2 ft. in diameter operating in the manner shown in Fig. 2, treating at the rate of 100 barrels per day No. 3 oil (Oregon basin Wyoming crude) containing 2.13% sulfur and recovering No. 3 oil containing 0.3% sulfur, and operating at approximately 100 p.s.i.g. pressure, the various zones have the approximate heights: G=3 ft., N-1=10 ft., N-2=10 ft., N-3=5 ft., Q=4 ft., and R=8 ft.

The material flow and temperature conditions are tabulated below:

| Component | Temp. | Composition | Rate in lb./min. |
|---|---|---|---|
| P | 200° F. | Basic Nickel Carbonate | .17 |
| | | $H_2O$ | .04 |
| D | 550° F. | Treated Heavy Oil Vapors | 19.85 |
| | | Treated Light Oil Vapors | .88 |
| | | $CO_2$ | .03 |
| | | $H_2O$ | .66 |
| | | $H_2$ to recycle | .92 |
| | | $H_2S$ | .33 |
| α (incl. $H_2$) (introduced at bot. of zone 2) | 650° F. | Untreated Oil Vapor | 21.29 |
| | | $H_2$ | .94 |
| S | 350° F. | Steam | .99 |
| | | (up) | .66 |
| | | (down) | (.33) |
| F | 1,000° F. | $CO_2$ | 3.20 |
| | | $N_2$ | 8.67 |
| | | $SO_2$ | .05 |
| | | $H_2O$ | 6.71 |
| O | 500° F. | Air | 2.84 |
| | | Recycle Gas | 10.20 |
| C | 900° F. | $NiSO_4/NiO$ | .13/.04 |

In addition, steam at 350° F. is introduced into the oxidizing zone R at the rate of about 5.08 lb./min. to maintain a maximum temperature in each case of about 1,000° F.

In this case the hydrofining zone is composed of three zones, top at 570° F., middle at 745° F., and bottom at 570° F.

The hydrogen sulfide in the product vapors (D) is removed by conventional means either quantitatively, by absorption in an alkaline medium, or to a desired extent by differential pressure techniques, absorption, or other conventional means. In this connection the presence of a small amount of $H_2S$ in the recycled hydrogen may be tolerated or even desired.

In the process as above described wherein hydrogen sulfide formed in hydrofining zone N-2 passes through zone N-1, it will be apparent that some desulfurizing action in zone N-1 will comprise reaction with hydrogen sulfide rather than with sulfur containing hydrocarbons. While this somewhat lowered efficiency in catalyst utilization is offset and overshadowed by the many-fold increase in catalyst efficiency in the three stage hydrofining process, it can be eliminated, and the overall efficiency can be further enhanced by preventing hydrogen sulfide from reaching the first hydrofining zone (N-1).

As shown in Fig. 3 of the drawing, this can be accomplished by withdrawing vapors from the column between zones N-2 and N-1, removing hydrogen sulfide therefrom, for instance by reaction with lime, and returning the hydrogen sulfide free vapors to the column at the bottom of zone N-1. Since no hydrogen sulfide is formed in zone N-1 the final hydrofined product as discharged at D in Fig. 3 is essentially free of hydrogen sulfide. It will be understood that this type of operation has the further advantage of permitting maximum sulfur removal from hydrocarbon vapors and thus is particularly adapted to the production of end products having very low sulfur content.

The more efficient use of catalyst in zone N-1 can also be achieved by a modification of the process as shown in Fig. 4 of the drawing, wherein part of the feed stock, i.e. the lighter hydrocarbon vapors, are circulated concurrently through the catalyst in zone N-1 and the remainder of the feed stock, i.e. the heavier hydrocarbon vapors, are circulated countercurrently through the catalyst in zones N-3 and N-2. The hydrofined product discharged at (Z) between zone N-1 and N-2 will then contain hydrogen sulfide (formed in zone N-2) which can be removed by conventional means.

The process as shown in Fig. 4 of the drawing has an additional advantage due to the fact that drying and/or calcining in zone (J) is wholly independent of the hydrofining operations and can be controlled more precisely to provide enhanced desulfurizing activity in the catalyst which enters zone N-1.

A further modification of my three stage hydrofining process is shown in Fig. 5 wherein separate feeds of oil vapors are provided for countercurrent flow through zones N-3 and N-2 and through zone N-1. The treated vapors from zones N-3 and N-2, containing hydrogen sulfide, are discharged at Z, at the top of zone N-2. The vapors introduced at the bottom of zone N-1 are at a slightly greater pressure than the outlet vapors Z thereby preventing hydrogen sulfide containing vapors from entering zone N-1. It will be understood that in zone N-1 I can effect both hydrofining and pretreatment of catalyst as shown in Fig. 2. On the other hand, hydrofined vapors can be withdrawn at the top of zone N-1 and the catalyst pretreatment can be effected in a separate zone as shown in Fig. 4.

Operation of the process according to the procedure shown in Fig. 5 provides very efficient desulfurization in zone N-1 because of the absence of hydrogen sulfide in this zone, and also because with the countercurrent flow, fresh catalyst is meeting oil vapors of low sulfur content.

It will be understood that other changes and modifications in the overall operation of the column of the type disclosed in said prior application Serial No. 355,138 pertaining to drying and/or calcining of catalyst, heat conservation between the various incompatible zones of the column, and the like, can be employed in connection with my three stage hydrofining process. It should also be noted that for controlling temperature and rate of reaction in the various hydrofining zones a suitable diluent can be introduced as needed, such for example as steam, water fog, carbon dioxide or recycled product vapors.

In thus varying the overall operation of the column to accommodate for changes in feed stocks, type and extent of desulfurizing desired, and type of by-product, i.e. hydrogen sulfide, or sodium sulfate, most economical at the time, it is advantageous to employ a column of the type wherein the various fluid and vapor inlets and outlets are detachably mounted in the column and can be quickly and easily moved to different positions in the column as modified conditions may require changes in the size and location of the various zones within the column.

Notwithstanding the emphasis which has been placed on the use of my three stage hydrofining process in an overall process wherein pretreatment of catalyst, hydrofining, and partial regeneration of catalyst are conducted within a unitary chamber or column, it is to be understood that my invention resides basically in the three stage hydrofining process per se, whether conducted in a unitary chamber or column, or in separate chambers.

The relative size of the three zones of a unitary chamber or the three separate chambers will vary depending upon the particular combination of end results desired in the hydrofined product and sulfur containing by-product. Typical combinations of conditions are as follows:

A. Where an aromatic product is desired and the by-product value is high.

B. Where an aromatic product is desired and the by-product value is low.

C. Where an aliphatic product is desired and the by-product value is low.

D. Where an aliphatic product is desired and the by-product value is high.

(In A to D above "by-product" has reference to sodium sulfate.)

The approximate relative size of the separate zones or reactors suitable for these combinations of conditions are tabulated below:

*Hydrofining stage*

|   | 1st, percent | 2nd, percent | 3rd, percent |
|---|---|---|---|
| A | 20 | 60 | 20 |
| B | 10 | 80 | 10 |
| C | 40 | 40 | 20 |
| D | 100 | 0 | 0 |

It is evident that the combination of conditions identified as D above is a limiting situation where hydrofining in a single stage using a sulfur sensitive catalyst is preferable to my new three stage hydrofining process. If these conditions are of a permanent nature a permanent single stage installation would be practical. In the normal instance where conditions "D" would prevail only part of the time and operation under conditions "A," "B," or "C" will be required at other times, the flexibility of my three stage process, particularly as carried out in a unitary chamber or column which can readily be converted to the one stage operation, is distinctly advantageous.

It will be evident from the foregoing that hydrogen concentration in the different hydrofining zones or stages is a primary factor in controlling the several reactions. There should be substantially more hydrogen in zone 2 than in zones 1 and 3. As a general rule the hydrogen concentration in zone 2 should be about ten times greater than in zones 1 and 3, although under special conditions as little as a two-fold excess or as much as about a twenty-fold excess of hydrogen in zone 2 as compared with zones 1 and 3 can be employed. Expressed in actual amounts the feed of hydrogen in zones 1 and 3 should be about 100 cu. ft. per barrel of oil treated, as compared with about 1,000 cu. ft. per barrel in zone 2. Optimum control of hydrogen concentration in all zones is possible in the procedures as shown in Figs. 4 and 5 where product vapors from zone N–2 do not reach zone N–1. On the other hand, with the procedures as shown in Figs. 2 and 3 the hydrogen concentration in zone N–1 will generally be greater than optimum due to a carry over from zone N–2.

While the three stage hydrofining process and various modifications thereof have been described using nickel catalyst, it is to be understood that I can employ nickel catalyst alone or in combination with inert diluents or carriers as well as with other catalytic materials such as compounds of iron, copper, cobalt, and the like.

It will also be understood that it is within the scope of my invention to employ the second and third hydrofining stages, apart from the first hydrofining stage as a means for resulfiding spent nickel sulfide catalyst either for further use as catalyst in hydrofining to hydrogen sulfide or for preparing spent catalyst for efficient chemical regeneration via nickel sulfate. The operations of hydrofining to remove sulfur as hydrogen sulfide according to the second stage operation and hydrofining to resulfide the catalyst according to the third stage operation can, if desired, be repeated a number of times, i.e. until the catalyst ceases to be sufficiently active in the second stage operation. The final operation, however, should always be of the third stage type to resulfide the catalyst substantially to nickel sulfide so that efficient chemical regeneration can be effected.

Various changes and modifications in the procedure herein disclosed will occur to those skilled in the art, and to the extent that such changes and modifications are embraced by the appended claims, it is to be understood that they constitute part of my invention.

I claim:

1. The process for desulfurizing sulfur-containing hydrocarbons that comprises contacting such hydrocarbons in the vapor state with a moving bed of nickel catalyst wherein spaced portions of said moving bed provide three hydrofining stages, said catalyst in the first stage being a sulphur sensitive nickel compound and effecting desulfurization essentially by conversion to nickel sulfide, the nickel sulfide in the presence of hydrogen acting catalytically at a substantially higher temperature in the second stage to remove sulfur from said hydrocarbons as hydrogen sulfide while itself being gradually inactivated by loss of sulphur, and the partially desulfided catalyst effecting desulfurization in said third stage at a temperature substantially lower than that of the second stage by again being converted essentially to nickel sulfide.

2. The process as defined in claim 1 wherein at least part of the hydrocarbon vapors contact catalyst initially in the third hydrofining stage and then in the second hydrofining stage.

3. The process as defined in claim 1 wherein the hydrocarbon vapors contact catalyst initially in the third hydrofining stage, then in the second hydrofining stage and finally in the first hydrofining stage.

4. The process as defined in claim 1 wherein a portion of the hydrocarbon vapors contact the catalyst initially in the third hydrofining stage and then in the second hydrofining stage and another portion of said vapors contact the catalyst initially in the first hydrofining stage.

5. The process as defined in claim 1 wherein the hydrocarbon vapors are contacted with the catalyst countercurrently through at least the third and second hydrofining stage.

6. The process as defined in claim 1 wherein the hydrocarbon vapors are contacted with the catalyst countercurrently through the third, second, and first hydrofining stages.

7. The process as defined in claim 6 wherein the hydrocarbon vapors are withdrawn from the catalyst after passing through the second hydrofining stage and are treated for removal of hydrogen sulfide.

8. The process as defined in claim 6 wherein the hydrocarbon vapors are withdrawn from the catalyst after passing through the second hydrofining stage and are treated for removal of hydrogen sulfide and are then introduced to the first hydrofining stage.

9. The process as defined in claim 1 wherein hydrocarbon vapors are contacted with the catalyst countercurrently through the third and second hydrofining stages and concurrently through the first hydrofining stage.

10. The process as defined in claim 1 wherein separate feeds of hydrocarbon vapors are contacted with the catalyst countercurrently, one of said feeds passing through the third and second hydrofining stages and the other feed passing through the first hydrofining stage.

11. The process as defined in claim 1 wherein the conditions of temperature, pressure, hydrogen concentration and effective length of catalyst bed in the respective zones are variable between conditions which prolong the second hydrofining stage to remove sulfur from the hydrocarbon vapors predominantly as hydrogen sulfide, and conditions which minimize the duration of the second hydrofining stage to thereby remove sulfur from the hydrocarbon vapors predominantly as nickel sulfide.

12. The process as defined in claim 1 wherein operating conditions of substantially higher temperature, pressure, and hydrogen concentration in hydrofining stage 2 then in stages 1 and 3 are selected to prolong the second hydrofining stage to thereby effect removal of sulfur from said hydrocarbon vapors predominantly as hydrogen sulfide.

13. The process as defined in claim 1 wherein the hydrocarbon vapors contact said catalyst at a pressure within the range of about 25 to 250 p.s.i.g. and at temperatures of below about 650° F. in the first hydrofining stage, at a substantially higher temperature within the range 650–750° F. in the second hydrofining stage, and again at a substantially lower temperature below about 650° F. in the third hydrofining stage, and wherein the hydrogen concentration in the second hydrofining stage is 2 to 20 times greater than in the third hydrofining stage.

14. The process as defined in claim 1 wherein the hydrocarbon vapors contact said catalyst at a pressure within the range of about 25 to 250 p.s.i.g. and at temperatures of below about 650° F. in the first hydrofining stage, at a substantially higher temperature within the range 650–750° F. in the second hydrofining stage, and again at a substantially lower temperature below about 650° F. in the third hydrofining stage, and wherein the hydrogen concentration in the second hydrofining stage is 2 to 20 times greater than in the first and third hydrofining stages.

15. The process that comprises contacting a moving bed of nickel catalyst at elevated temperatures and pressures with sulfur-containing hydrocarbon vapors in three hydrofining stages, the catalyst in said first hydrofining stage being a sulfur sensitive nickel compound and effecting desulfurization of the hydrocarbon vapors by reaction at a temperature below about 650° F. to convert the same to nickel sulfide, said nickel sulfide acting catalytically in the second hydrofining stage at a substantially higher temperature within the range of about 650–750° F. and in the presence of excess hydrogen to remove sulfur from said hydrocarbon vapors as hydrogen sulfide while itself being partially desulfided, and said partially desulfided catalyst effecting desulfurization of the hydrocarbon vapors in the third hydrofining stage at a substantially lower temperature by reaction at a lower temperature below about 650° F. to again convert the catalyst essentially to nickel sulfide.

16. The process as defined in claim 15 wherein catalyst is introduced to said moving bed as a wet slurry of a sulfur sensitive nickel compound which is dried by the heat of the treated hydrocarbon vapors for utilization in said first hydrofining stage.

17. The process as defined in claim 15 wherein spent nickel sulfide catalyst leaving the third hydrofining stage passes through a vapor barrier comprising inert gas at increased pressure and is then oxidized substantially to nickel sulfate before being discharged.

18. The process as defined in claim 15 wherein catalyst is introduced to said moving bed as a wet slurry of a sulfur sensitive nickel compound which is dried by the heat of the treated hydrocarbon vapors for utilization in said first hydrofining stage, and the spent nickel sulfide catalyst leaving the third hydrofining stage passes through a vapor barrier comprising inert gas at increased pressure and is then oxidized substantially to nickel sulfate before being discharged.

19. The process for desulfurizing sulfur-containing hydrocarbons that comprises contacting such hydrocarbons in the vapor state with nickel catalyst in at least two hydrofining stages, said catalyst in one of said stages being essentially nickel sulfide and removing sulfur from said hydrocarbon vapors in the presence of hydrogen as hydrogen sulfide, while itself being gradually inactivated by loss of sulfur, and the partially desulfided catalyst in the other of said hydrofining stages effecting desulfurization by again being converted to nickel sulfide.

20. The process as defined in claim 19 wherein hydrocarbon vapors are contacted with said catalyst at a pressure within the range of about 25 to 250 p.s.i.g. and at a temperature of about 650–750° F. in the hydrogen sulfide forming stage and at a substantially lower temperature and below about 650° F. in the resulfiding stage, and wherein the hydrogen concentration is 2 to 20 times greater in the hydrogen sulfide forming stage than in the resulfiding stage.

References Cited in the file of this patent

UNITED STATES PATENTS

| Number | Name | Date |
|---|---|---|
| 2,174,510 | Gwynn | Oct. 3, 1939 |
| 2,273,298 | Szayna | Feb. 17, 1942 |
| 2,337,358 | Szayna | Dec. 21, 1943 |
| 2,498,559 | Layng et al. | Feb. 21, 1950 |
| 2,587,987 | Franklin | Mar. 4, 1952 |
| 2,758,059 | Berg | Aug. 7, 1956 |
| 2,761,817 | Sweetser | Sept. 4, 1956 |